No. 631,742. Patented Aug. 22, 1899.
O. L. GARDNER.
METHOD OF MANUFACTURE AND PRODUCT OF ARTIFICIAL LUMBER.
(Application filed Oct. 29, 1898.)
(No Model.) 5 Sheets—Sheet 3.
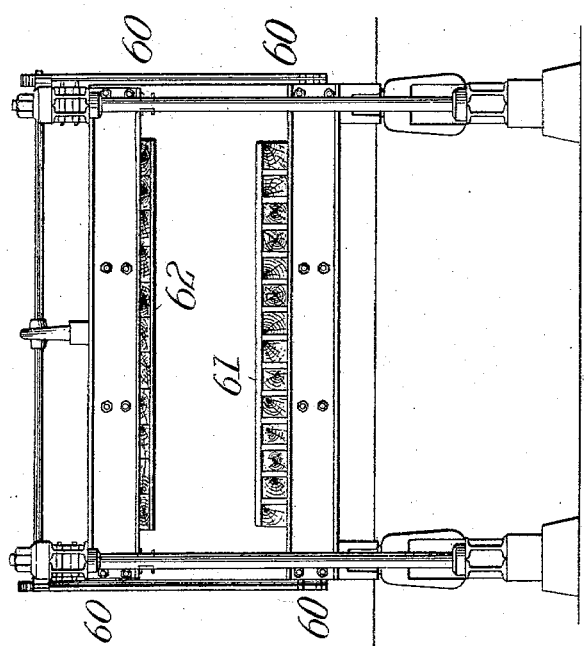
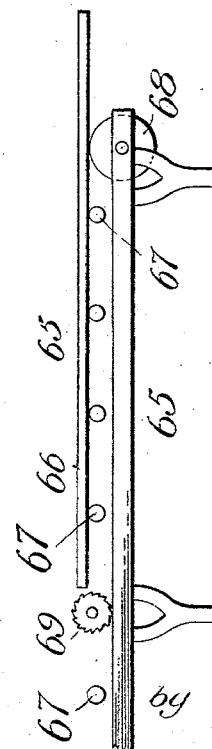
Witnesses:
Harry S. Rohrer
Harry L. Marsh
Inventor:
O. L. Gardner
by E. B. Clark
atty.

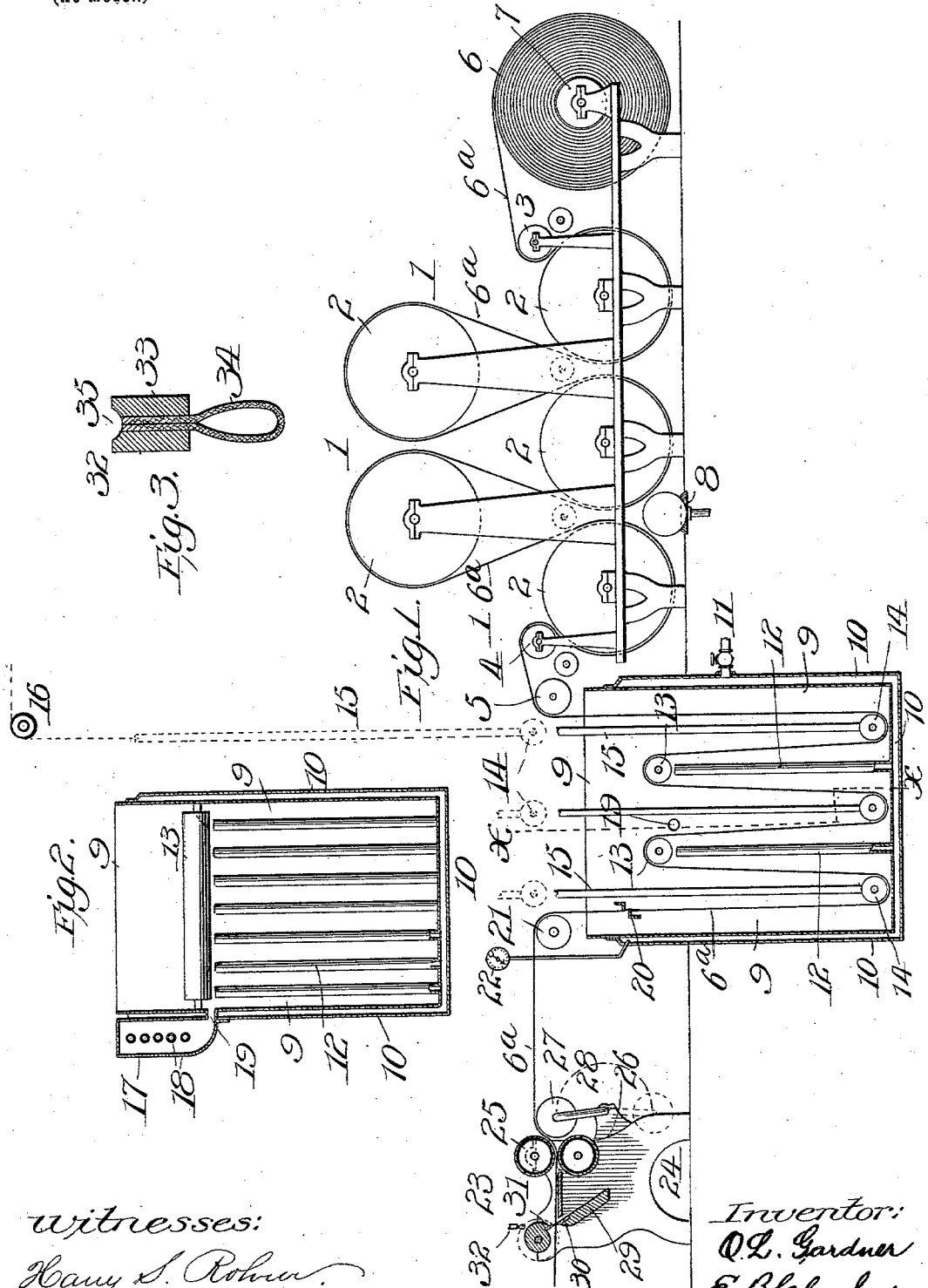

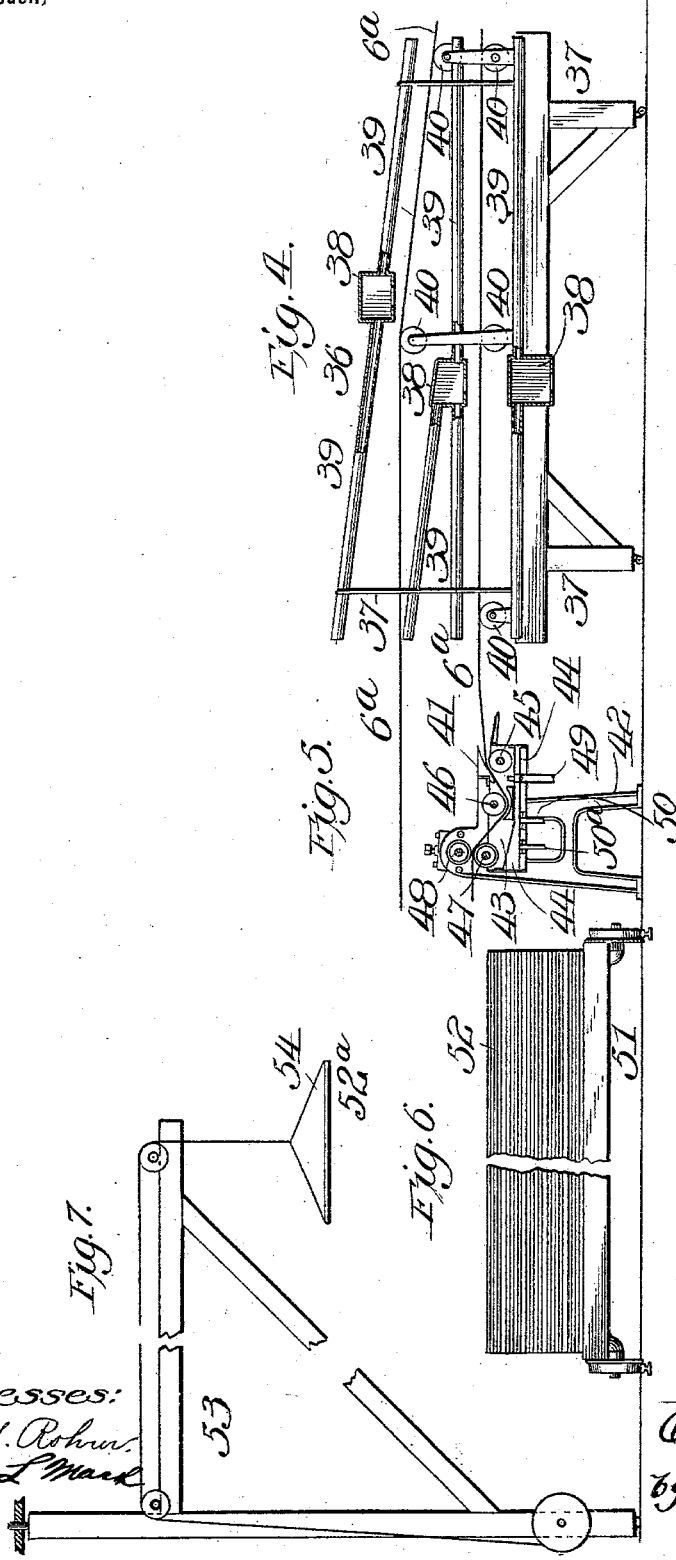

No. 631,742. Patented Aug. 22, 1899.
O. L. GARDNER.
METHOD OF MANUFACTURE AND PRODUCT OF ARTIFICIAL LUMBER.
(Application filed Oct. 29, 1898.)
(No Model.) 5 Sheets—Sheet 4.
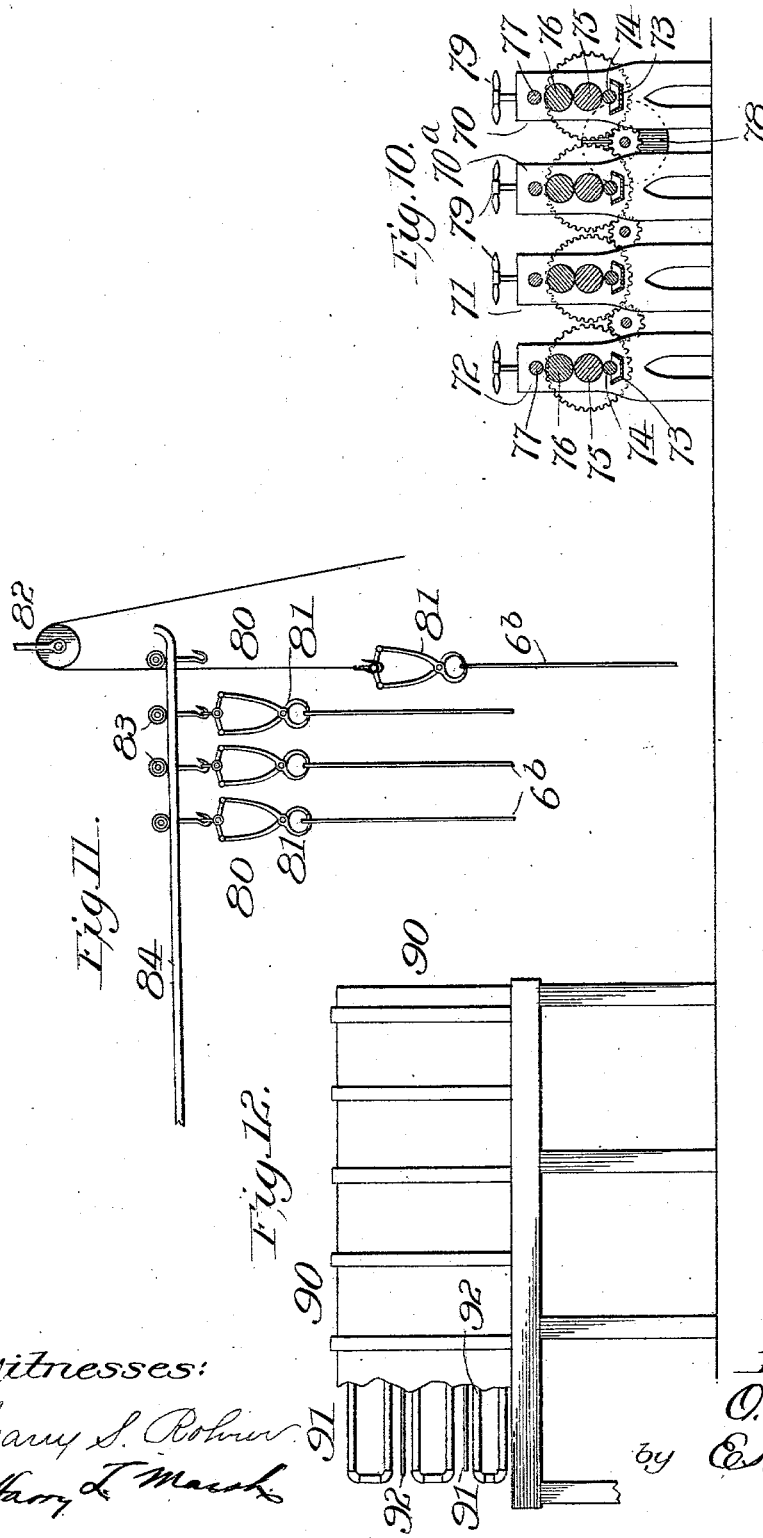
Witnesses:
Harry S. Rohrer
Harry T. Marsh
Inventor:
O. L. Gardner
by E. B. Clark
atty.

No. 631,742. Patented Aug. 22, 1899.
O. L. GARDNER.
METHOD OF MANUFACTURE AND PRODUCT OF ARTIFICIAL LUMBER.
(Application filed Oct. 29, 1898.)
(No Model.) 5 Sheets—Sheet 5.
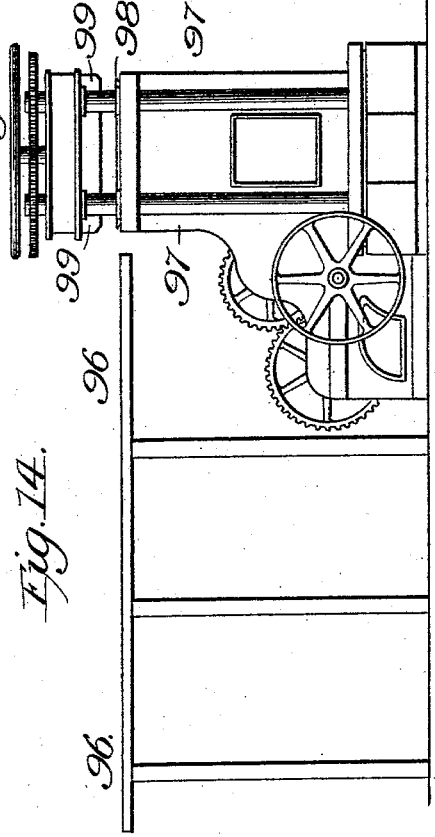
Witnesses:
Harry S Rohrer
Harry L Marsh
Inventor:
O. L. Gardner
by E. B. Clark
atty.

UNITED STATES PATENT OFFICE.

OLIVER L. GARDNER, OF NEW YORK, N. Y.

METHOD OF MANUFACTURE AND PRODUCT OF ARTIFICIAL LUMBER.

SPECIFICATION forming part of Letters Patent No. 631,742, dated August 22, 1899.

Application filed October 29, 1898. Serial No. 694,980. (No model.)

*To all whom it may concern:*

Be it known that I, OLIVER L. GARDNER, a citizen of the United States, residing at New York, (Brooklyn,) in the county of Kings and State of New York, have invented certain new and useful Improvements in Methods of Manufacture and Products of Artificial Lumber; and I do hereby declare the following to be a full, clear, and exact description of the invention, such as will enable others skilled in the art to which it appertains to make and use the same.

This invention relates to artificial lumber or panels for architectural and decorative purposes and to the process of producing such material.

The object of my invention is to make from crude strawboard, paper-board, or like fibrous material finished composite boards and panels, possessing great density and toughness, which are practically waterproof and non-inflammable and are particularly adapted for the interior finish and decoration of houses, railway-cars, steam vessels, &c.

Another object is to provide for producing boards and panels which shall be free from tendency to warp or twist or shrink or crack in use.

Another object of my invention is to provide for more thoroughly and effectively filling the pores of the strawboard and cementing the fibers with a saturating solution which imparts greater hardness, density, and toughness to the product than was heretofore attainable.

Another object is to provide for cementing sheets or strips of saturated strawboard by means of a solution which is non-combustible and serves in the production of a product which is non-inflammable, said cementing solution also saving a large percentage in the expense of manufacturing a product which is superior in quality to that which has heretofore been produced.

Another object of my invention is to produce a decorative embossed panel to which the embossing operation is applied after the painting, graining, or frescoing operation, so that the lines of the design or configuration shall be sharp, clear, and well defined, giving a more pleasing and artistic effect than that produced by the methods heretofore practiced.

The apparatus and machinery for carrying out my process and producing the finished article are illustrated in the proper order for conducting the successive operations in the accompanying drawings, in which—

Figure 1 represents a sectional elevation of the paper drier and heater, the saturation-tank, and the cutting-machine. Fig. 2 represents a transverse section on line $x$ $x$ of the saturation-tank, oil-receptacle, and rosin-melter. Fig. 3 represents a transverse section, on enlarged scale, of the wiper for the cutting-machine. Fig. 4 represents a side elevation of the cooling apparatus with portions broken away. Fig. 5 represents an elevation of the cementing-machine with parts in section. Fig. 6 represents a longitudinal elevation of one of the transferring-cars laden with cemented boards and steel platens. Fig. 7 represents an elevation of a crane for moving the steel platens. Fig. 8 represents a side elevation of the hydraulic press. Fig. 9 represents a side elevation of the sawing and edging machine. Fig. 10 represents a transverse sectional elevation of the painting, graining, and decorating machines. Fig. 11 represents a longitudinal elevation of apparatus for suspending and drying the painted boards. Fig. 12 represents a longitudinal side elevation, party in section, of the hot kiln or heater. Figs. 13 and 14 represent longitudinal elevations of tables for supporting and guiding boards to and from the embossing-machine. Fig. 15 represents a side elevation of the embossing-machine. Fig. 16 represents a longitudinal elevation of a cove-bending machine. Fig. 17 represents an end elevation thereof. Fig. 18 represents a side elevation of one end of the same machine on enlarged scale.

The drawings are to be read from right to left, commencing with Sheet 1, as they show in that order the apparatus and machines for performing the different operations for manufacturing my artificial lumber.

For convenience and distinctiveness in description I shall designate my raw material as the "roll of strawboard" or "sheets or strips of strawboard" and my product as "boards or panels of artificial lumber."

In manufacturing my artificial lumber I preferably use as the raw material what is known as "No. 50 strawboard" in rolls in the ordinarily dry condition and first pass it through a drier, where it is heated to about 150° to 200° Fahrenheit. The drier, Fig. 1, is provided with steam-heated cylinders 2, suitably mounted in journal-boxes on a frame; also, with suitable guide-rollers 3, 4, and 5. The paper or strawboard roll 6 is placed upon a core 7 on a mandrel, and the strip of board $6^a$ is passed therefrom over guide-roll 3 and then successively over and around the five steam-heated drying-cylinders 2, and thence out at the discharge end over the guide-rollers 4 and 5 and into the saturation-tank 9. The steam-heated drying-cylinders are revolved by the beveled driving-gears 8 and other suitable gearing. (Not here shown.) In practice steam-pipes (not here shown) connect with the opposite ends of the cylinders 2 through their journals in a well-known manner.

The saturation-tank 9 is provided with a steam-jacket 10 around its four sides and bottom and extends below the floor-line, as shown, for providing a sufficient depth of saturating liquid. The tank 9 is provided with two transverse rows of vertical steam-pipes 12, closed at the top and screwed at their lower ends into the bottom plate of the tank, where they open freely into the steam-jacket, as shown. A steam-supply pipe 11, having a valve, connects with the steam-jacket space. Above the tops of the steam-tubes are fixed two transverse stationary rolls 13 as guides for the strip of paper. In addition to the stationary rolls 13 I provide three vertically-adjustable guide-rolls 14, which are journaled upon the lower ends of the frames or rods 15. These frames or rods are connected at their upper ends by ropes or chains, which pass over elevated pulleys 16, so that they may be raised to the elevated position shown in dotted lines, Fig. 1. At one side or end of the saturation-tank 9 I construct a rosin-melting compartment 17, Fig. 2, which is provided with a coil or serpentine of steam-heating pipe 18 and with a bottom opening 19, connecting with the saturation-tank 9. This compartment 17 also serves as a receptacle for the oils which are mixed with rosin to form my saturating solution. At the delivery side and near the upper end of the saturation-tank is provided a transverse scraper 20, composed of two angle-irons, one a little above the other, between which the strip of board $6^a$ is passed to remove the surplus of saturating liquid. A steam-pressure gage 22 connects with the steam-jacket. Steam is preferably maintained in the jacket 10 at a pressure of about one hundred and fifty pounds, so as to maintain the saturating liquid in the tank at a temperature of about 350° Fahrenheit.

Guide-roller 21 is placed above the outlet side of the tank for conducting the strip of board $6^a$ to the cutting-machine 23, which is placed at a convenient distance from the saturation-tank. The cutter 23 has a suitable frame 24, provided with suitable journal-boxes, in which are supported by their journals a pair of pressure-rolls 25 and 26, which in practice are operated by suitable gearing (not here shown) for drawing forward the strip of board $6^a$. A swinging guide-roller 27, supported by a journaled arm 28, is provided for guiding and supporting the strip of board on its passage to the pressure-rolls. The roller 28 can be swung downward into the position shown by dotted lines. The paper passes from rolls 25 and 26 over a supporting-plate to the cutting-knives. The lower stationary knife or blade 30 is secured to a heavy transverse bar 29, and the revolving blade or knife 31 is secured to an eccentric revoluble mandril, so that its cutting edge will just pass by the cutting edge of the blade 30 and serve to cut the strips of board into sheets of the desired length. In practice a pair of cone-pulleys and belt (not here shown) are provided for imparting the desired speed to the revolving blade to cut the strip of board into the desired lengths. A belt-shifter (not here shown) is also provided in practice for so shifting the belt as to vary the speed of the revolving knife, and thus vary the lengths of the cut sheets. In the path of the revolving knife, as indicated by dotted line, is secured a transverse wiper 32, which is composed of a clamping-frame 33, Fig. 3, and depending folds of felt 34. At the top of the frame is formed a groove 35, to which oil is supplied for keeping the felt wiper 34 well saturated for the purpose of removing the gummy matter, which would otherwise adhere to and clog the revolving blade 31. The oil supplied to the groove 35 is absorbed by the depending folds of felt 34, only sufficient oil being supplied for that purpose. This device is quite important in practice in order to produce a clean sharp cut of the passing strip of board.

In practice I usually cut the strip of board in sheets twelve feet long to form my standard board; but other lengths are readily cut for special purposes by properly adjusting the operating gearing of the revolving knife. As the sheets of saturated board are delivered from the cutter they are moist, warm, and somewhat sticky from the effect of the saturating solution and must be cooled and dried before being coated with the cementing solution. For this purpose I provide a cooling machine or apparatus 36, as shown in Fig. 4. Upon a suitable frame 37 are supported three transverse air-blast boxes 38 at suitable distances one above another, and the longitudinal perforated distributing-pipes 39, extending from said boxes to the opposite ends of the frame. In practice three-inch pipes of galvanized iron are used, and the bottom pipes are perforated at the top. The middle pipes are perforated both at top and bottom, and the upper pipes are perforated along their under sides. Between the longitudinal pipes are journaled to the frame two sets of guide-pulleys 40 for supporting and guiding the sheets of board as they are passed between the blast-pipes. The separate sheets of board may be passed over the guide-pulleys 40 by hand, or said pulleys may be provided with belts (not here shown) for traversing the sheets of paper between the perforated blast-pipes. Cold air is forced from any suitable blower and connecting-pipes (not here shown) into the boxes 38, from which it is discharged through the perforated pipes 39 in numerous jets upon both sides of the sheets of board $6^a$. The sheets are thus rapidly cooled and dried ready for the application of cement. I purposely provide three sets of perforated tubes and two sets of guide-rollers between them, as shown, so that two sheets of board are simultaneously cooled and dried, one of said sheets being passed above the cementing solution, while the other sheet is passed through it. Since my board is made up of three, five, or more sheets of board, it will be understood that only alternate sheets need to be coated with the cementing solution on both sides in order to cause all the sheets forming the board to adhere together. For instance, in a three-sheet board only the middle sheet would be passed through the cementing-machine and the cement applied to both sides thereof. The lower and upper sheets would then be caused to adhere to the middle sheet by the cement which was applied thereto. In a five-sheet board the second and fourth sheets only would be passed through the cementing solution. The sheets of board $6^a$ having been properly cooled and dried, as described, the desired number of them are passed through the cementing-machine 41. (Shown in Fig. 5.) This machine consists of a suitable supporting-frame 42, a cementing-vat 43, having a steam-jacket 44, the guide-rollers 45 and 46, immersed in the cementing solution, and the distributing and pressure rollers 47 and 48, the upper one, 48, of which is above the level of the cementing solution. A draw-off pipe 49 connects with the bottom of the vat 43, and steam supply and outlet pipes 50 and $50^a$ connect with the jacket 44.

In the vat of the cementing-machine I use liquid silicate of soda of about 50° gravity. This cement serves admirably for causing the sheets of board to adhere together and renders the product practically non-inflammable. It also greatly reduces the cost of the product as compared with the adhesives, such as glue, which have heretofore been used for causing sheets of board to adhere one to the other. With the silicate-of-soda solution I have obtained excellent results in practice and regard its application and use as an important part of my process.

Beyond the cementing-machine is provided a transferring-car 51, Fig. 6, having wheels running on rails, as shown. The sheets of board $6^a$, some of which are free from cement and those which have been coated with the cement, are laid in the proper order upon the platform of this car to form boards. From three to six boards may be thus laid, one above the other, and then on top is placed a steel platen $52^a$, which will be lifted from a pile of platens by the crane 53, Fig. 7, and its clutch-frame 54, which is designed for engaging the platens at their opposite edges and holding them until they are swung into position and lowered upon the pile of boards on the car. In Fig. 7 the clutch-frame 54 is shown as engaging the opposite longitudinal edges of the platen $52^a$, thus presenting to view one end of the platen and indicating its approximate width. If found desirable, a steel platen may be placed between each pair of boards. These platens serve to keep the boards more straight and even than would otherwise be possible when the pile is subjected to the high pressure in the hydraulic presses. After the pile 52 of boards and platens has been built up to the desired thickness, such as two feet or more, the car is moved on the rails to the hydraulic press 60, Fig. 8, and is run directly onto the lower movable bed 61 thereof, where the wheels are removed. The press is now operated in the usual manner, forcing the lower movable bed-plate upward and pressing the pile of boards and platens against the upper fixed plate or body 62 of the press.

The hydraulic presses are of a well-known kind and are operated by means of pumps and accumulators (not here shown) in the usual manner. In these hydraulic presses the piles of boards containing the freshly-cemented sheets and the steel platens are subjected to a pressure of about one hundred and fifty tons for about six hours in case of boards which are twelve feet long by thirty-two inches wide. Such pile may contain about one hundred boards. The pressure causes the cemented surfaces to firmly adhere, and while the cement sets the boards are prevented from warping and twisting and are finally removed from the press strong and straight and ready for subsequent treatment to complete them for architectural and decorative panels, &c. After removal from the press the boards are conveyed by the transfer-car to the sawing-machine 65, Fig. 9, where the side and end edges are trimmed to make them perfectly true and of uniform length and width. The sawing-machine, having a suitable frame and bed, is also provided with a carriage 66 for supporting the boards, which is supported on the guide-rollers 67.

A driving-pulley 68 through the medium of a suitable belt (not here shown) serves to traverse the carriage past the circular saw 69, whereby the boards are trimmed at the edges or sawed into strips of the desired width. A similar saw may also be mounted in the machine for trimming the end edges.

For some purposes the boards are rabbeted at the edges for making overlapping joints in case they are to be used for walls and ceilings. In practice a suitable rabbeting-machine is used, but is not here shown, as it is of a well-known character. For many uses, moreover, the edges of the boards are not rabbeted, and that is not a necessary operation in my process.

The boards having been sawed to the required length and width are then subjected to the operations of painting, graining, and frescoing in suitable machines, such as 70, 70ª, 71, and 72. (Shown in Fig. 10.) These machines are constructed with suitable frames, in which are properly mounted by their journals, in yielding journal-boxes, the different rolls for applying the color. Below the rolls is secured a transverse color-box 73. A color-roll 74 is journaled just above the box, so that its periphery shall dip into the body of paint contained in the box. Above the color-roll is journaled an engraved roll 75, having upon its surface the different figures or designs which it is desired to imprint upon the board, and above such roll is journaled a soft-composition printing-roll 76, which receives the design from the engraved roll. Above the printing-roll is journaled a pressure-roll 77. In practice the rolls are journaled in movable journal-boxes (not here shown) and may be placed under the desired pressure by means of the adjusting-screws 79. Suitable gearing and a driving-pulley 78 are provided for turning the rolls in the proper direction for feeding forward the boards and applying the paint. Of the four painting-machines shown in Fig. 10 the first machine 70 may be used for painting, graining, or varnishing, the second machine 70ª for applying the second decorative color, the third machine 71 for applying the third decorative color, and the fourth machine 72 for applying the fourth decorative color.
In case the decorative design is to be shown in more than four distinct colors, then an additional machine is used for each color required. As the painted boards are passed out of the painting and decorating machine they are suspended at their ends by means of suitable clutch-tongs 81 in the drying apparatus 80, as shown in Fig. 11.

The clutch-tongs 81 are made with wide jaws and with pivoted links connecting their handles. An overhead pulley 82 is provided, over which is passed a rope or chain for raising each pair of tongs and its board to the trolleys 83, running upon the overhead rail 84. Each board 6ᵇ is thus engaged by a pair of tongs at its end and is then raised and hooked upon one of the trolleys. As the tongs and trolleys are thus filled they are pushed along on the rail 84 in a large drying-room. A number of such rails supplied with trolleys may be thus used in the same room. Dry air is circulated between the suspended boards, so that the paint will be quickly dried. If the painted boards are to be embossed they must first be thoroughly dried and then coated with a sizing liquid by passing them through a machine suited to the purpose and similar to one of the painting-machines. The sizing liquid is preferably composed of white of egg and water thoroughly mixed together in the proportion of about six to twelve whites of eggs to a gallon of water. This sizing is important in order to prevent the paint from sticking to the embossing-dies. Before the sized boards are embossed they must first be heated to about 150° Fahrenheit for making them sufficiently soft and pliable to readily take the impression of the dies. For this purpose they are placed in the hot kiln or heater 90, which is composed of a tight rectangular wooden box having two or more longitudinal steam-heating coils 91 and intermediate iron supporting-plates 92, as shown in Fig. 12 of the drawings. The boards having been heated to the desired temperature they are then removed from the hot kiln and placed upon a table 95, Fig. 13, which in practice is provided at the top with a gage (not here shown) to guide the boards accurately into the embossing-machine 97, which is represented diagrammatically in Fig. 15. In practice an embossing-machine well known in the trade is used and is provided with a lower movable plate 98 and an upper stationary plate 99. The male and female embossing-dies are fixed to these lower and upper plates of the machine, the board is inserted between them, and pressure is applied for producing the embossing effect in a well-known manner. As the embossed boards are removed from the machine they are supported on the table 96. Frequently boards twelve feet long are subjected to the embossing operation, being moved forward for each successive impression of the dies, and therefore the table 96 will be provided at the top with a gage perfectly in line with the gage on the table 95 to accurately guide the board through the embossing-machine.

For architectural purposes strips of my artificial lumber eight, ten, or twelve inches wide are bent to form coves which are used as an artistic finish at the angles of the side walls and ceilings of an apartment, and for this purpose I use a caul 100. (Shown in Figs. 16 to 18, inclusive.) This machine is styled a "caul" for bending coves and is composed of the lower form 101, the movable upper form 102, and the clamping-links 103, which are pivotally connected to the opposite ends of the lower form. A lever 104, having a short fork at its lower end for engaging pin 105 and a notch in its upper face, is used for engaging the link 103, forcing down the upper form and placing the link over its projecting ends, as illustrated in Fig. 18. A strip of my artificial board is first placed in the lower form, and then the upper form is clamped down in position, as above described. The caul is left clamped together until the strip is well set in a curved form. Strips of my artificial lumber, either plain or painted or embossed, are thus formed into coves.

In carrying out my process ordinarily dry strawboard or paper-board as found in the market is used; but such material still contains a certain percentage of moisture which must be removed before it is passed into the saturation-vat, as otherwise the contained moisture would cause the saturating liquid to foam and froth to such an extent as to greatly interfere with the effective saturation. The strip of board $6^a$ is therefore passed over the heating-rolls and dried and heated to a temperature between 150° and 200° Fahrenheit. This operation opens the pores and drives off the water-vapor, so that the board will perfectly receive the saturating solution. This solution is preferably composed of ingredients in about the following proportions: To about one hundred pounds of rosin is added a mixture of paraffin-oil, one gallon, and linseed-oil, one-sixteenth ($\frac{1}{16}$) of a gallon. Steam at about one hundred and fifty pounds pressure is admitted to the jacket 10, and the mixture, in about the proportion above stated, is filled into the tank 9 until it rises within about six inches of the tops of the steam-heating tubes 12. Steam is also admitted into the coil 18, by means of which rosin is melted in the compartment 17. The vertically-movable guide-rollers 14 being in the elevated position above the tank 9, as indicated by dotted lines, the dry hot strip of board is drawn across the top of the tank, and then the rolls 14 are depressed, carrying down the strip of board over the rolls 13 so that it assumes a zigzag course up and down from the inlet to the outlet side of the tank, as clearly shown in Fig. 1. The strip of board is passed out through the scraper 20, over the guide-roller 21, and between the compression-rollers 25 and 26 of the cutter, by means of which the strip is drawn forward through the vat in exact proportion to the feed forward through the drier. I have found in practice that it is important to heat the solution composed of rosin, paraffin-oil, and linseed-oil to about 350° Fahrenheit in order to cause it thoroughly to penetrate the board, filling all the pores and interstices and thoroughly cementing the fibers. This high heat saves time in producing this very desirable result. The product of this process is denser, harder, tougher, and less liable to warp or shrink than any product heretofore produced. Unless this operation is thoroughly performed, as above described, the product is apt to absorb moisture and to break or split apart. As the saturated strip of board $6^a$ is drawn forward by the pressure-rollers 25 and 26 it is cut into the desired lengths by the revolving blade 31. The cut strips or sheets $6^a$ having been properly cooled and dried in the cooling-machine 36, as above described, the desired number of the same are passed through the cementing-machine 41, Fig. 5, where both sides are coated with liquid silicate of soda of about 50° gravity. This has proved to be a superior cement, and, in addition to its adhesive qualities, it materially assists in making the product non-inflammable, and its use saves a large percentage in cost as compared with the adhesive material heretofore used. The cement-coated sheets and those which have not been coated are laid together in the proper order and in the desired number of three, five, or more to form boards of the desired thickness. A number of such boards are laid upon the car 51 and then a hot steel platen is laid on top of them, after which five or six more boards are laid in place on the steel platen. The pile is thus built up two or more feet high and may be composed of about one hundred boards and the required number of hot steel platens. The platens prevent wrinkles in the boards and furnish smooth faces to the panels or boards. This pile 52 of boards and platens is transferred to the hydraulic press, where they are subjected to a pressure of about one hundred and fifty tons for a period of six hours or more. The boards when removed from the press are very dense, tough, and perfectly flat and straight. The sides and ends are then trimmed by a circular saw to make the boards of uniform width and length. The edges may then be rabbeted, if desired. The boards may be used for many purposes without painting, frescoing, or embossing; but if they are to be used for interior partition-walls, ceilings, &c., they are preferably painted, also decorated by suitable figures, and also frescoed with suitable ornamental designs preparatory to the embossing operation. After the boards have been painted, decorated, and frescoed in the desired designs and colors and dried, as heretofore described, they are coated with a sizing solution composed of white of egg mixed with water and are then placed in the hot kiln, where they are heated to a temperature ranging from 125° to 150° Fahrenheit to prepare them for the embossing operation.

The embossing operation is performed by machines of a well-known kind in the usual manner. If a fresco design or figure has been printed either in a single color or in different colors upon the painted board or panel, an embossing-die of the same pattern may be used for raising the painted or gilded design into relief. In this way very beautiful and artistic effects are produced.

My boards or panels besides being plain painted are also grained to imitate different kinds of wood—such as oak, maple, or mahogany—and are then varnished to produce a finished and elegant effect.

The apparatus shown and described is not claimed herein; but the saturating-tank and its immediate connections are made the subject of a separate application for patent, Serial No. 700,147, filed December 23, 1898.

Having described my invention, what I claim as new, and desire to secure by Letters Patent, is—

1. In the manufacture of artificial lumber, the method of thoroughly saturating the material to produce a dense, tough, waterproof product, which consists in treating strawboard with a solution of rosin, paraffin-oil and linseed-oil at a temperature of about 350° Fahrenheit, whereby the pores will be thoroughly filled and the fibers cemented to produce a dense, tough, waterproof product.

2. In the manufacture of artificial lumber, the method of thoroughly saturating the material to produce a dense, tough, waterproof product, which consists first, in heating and drying strawboard to expel moisture, expand and open the pores, and then, while hot, saturating such board with a solution of rosin, paraffin-oil and linseed-oil, at a high temperature, whereby the pores will be thoroughly filled and the fibers cemented to produce a dense, tough, waterproof product.

3. The process of making boards or panels of artificial lumber, which consists in saturating strawboard or other fibrous board with a waterproof solution and cementing the resulting separate sheets together, with silicate of soda.

4. The process of making boards or panels of artificial lumber, which consists in heating and drying strawboard, saturating it while hot with a heated solution of rosin and oil, drying and cooling, cementing the separate sheets with silicate of soda, laying them together to form boards, and subjecting them to high pressure.

5. The process of making painted and embossed boards or panels of artificial lumber, which consists in heating and drying strawboard or other fibrous board to open the pores and expel moisture, then saturating it, while hot, with a solution of rosin and oil, at a high temperature, cutting it into lengths, drying and cooling, cementing the separate sheets with silicate of soda, laying them together to form boards of the desired thickness, subjecting them to high pressure to cause the cemented sheets to adhere and set in flat, smooth condition, painting the boards or panels, and then subjecting them to the embossing operation, whereby the painted and embossed figure will appear, in sharp, clear lines.

6. The herein-described artificial lumber, composed of sheets of fibrous board thoroughly saturated, and their pores filled with a waterproof solution, said sheets being cemented together by a fireproof cement forming a dense, tough, non-absorbent, waterproof and non-inflammable product, substantially as described.

7. The herein-described panel of artificial lumber, composed of sheets of strawboard or other fibrous board, which are saturated and impregnated with a solution of rosin, paraffin-oil and linseed-oil, said sheets being cemented together with silicate of soda and pressed flat and smooth.

In testimony whereof I affix my signature in presence of two witnesses.

OLIVER L. GARDNER.

Witnesses:
JOSEPH BOUTON CROSBY,
WILLIAM N. CLARK, Jr.